US012585150B2

(12) United States Patent
Kim et al.

(10) Patent No.: US 12,585,150 B2
(45) Date of Patent: Mar. 24, 2026

(54) DISPLAY APPARATUS COMPRISING A COVER FRAME HAVING A THROUGH-HOLE THROUGH WHICH A SPEAKER PASSES

(71) Applicant: SAMSUNG ELECTRONICS CO., LTD., Suwon-si (KR)

(72) Inventors: Byoungjung Kim, Suwon-si (KR); Minsik Kim, Suwon-si (KR); Eunbi Kang, Suwon-si (KR); Hyunkyu Park, Suwon-si (KR); Hokweon Song, Suwon-si (KR); Mingyu Yoon, Suwon-si (KR); Taeyoun Yoon, Suwon-si (KR); Junsu Jung, Suwon-si (KR); Seungsan Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/760,645

(22) Filed: Jul. 1, 2024

(65) Prior Publication Data

US 2024/0353702 A1 Oct. 24, 2024

Related U.S. Application Data

(63) Continuation of application No. 17/139,754, filed on Dec. 31, 2020, now Pat. No. 12,072,562.

(30) Foreign Application Priority Data

Jan. 2, 2020 (KR) ........................ 10-2020-0000285

(51) Int. Cl.
*G02F 1/1333* (2006.01)
*H04R 1/02* (2006.01)

(52) U.S. Cl.
CPC .. *G02F 1/133314* (2021.01); *G02F 1/133317* (2021.01); *G02F 1/13332* (2021.01);
(Continued)

(58) Field of Classification Search
None
See application file for complete search history.

(56) References Cited

U.S. PATENT DOCUMENTS 6,807,051 B2 10/2004 Takahashi
6,894,739 B2 5/2005 Sung et al.
(Continued)

FOREIGN PATENT DOCUMENTS

CN 108873443 A * 11/2018 ............. G02F 1/133
CN 109061927 A * 12/2018
(Continued)

OTHER PUBLICATIONS

Communication dated Nov. 21, 2024, issued by the European Patent Office in European Application No. 20217713.5.
(Continued)

*Primary Examiner* — Paul C Lee
(74) *Attorney, Agent, or Firm* — Sughrue Mion, PLLC

(57) ABSTRACT

Provided is a display apparatus including a display module, a cover frame provided in a frame shape and coupled to a rear side of the display module to cover the display module, and a cover sheet coupled to a rear side of the cover frame and configured to form an appearance of the display apparatus. The cover frame includes an edge portion having a quadrangular-shape, a reinforcing portion extending inward from the edge portion, and openings formed between the edge portion and the reinforcing portion.

9 Claims, 10 Drawing Sheets

(52) U.S. Cl.

CPC ............. *H04R 1/023* (2013.01); *H04R 1/028* (2013.01); *G02F 2201/465* (2013.01); *G02F 2202/28* (2013.01); *H04R 2499/15* (2013.01)

(56) References Cited

U.S. PATENT DOCUMENTS

| | | | |
|---|---|---|---|
| 8,757,861 B2 | 6/2014 | Kim | |
| 9,140,840 B2 | 9/2015 | Jang et al. | |
| 9,632,342 B2 | 4/2017 | Lee et al. | |
| 10,649,255 B2 | 5/2020 | Kim et al. | |
| 11,112,631 B2 | 9/2021 | Oh | |
| 2003/0227581 A1* | 12/2003 | Sung ................. | G02F 1/133308 349/58 |
| 2012/0224338 A1 | 9/2012 | Park et al. | |
| 2013/0004006 A1 | 1/2013 | Onogi | |
| 2013/0051596 A1 | 2/2013 | Park et al. | |
| 2013/0088820 A1 | 4/2013 | Kuroda | |
| 2014/0198474 A1* | 7/2014 | Byeon .............. | G02F 1/133308 361/809 |
| 2016/0363803 A1 | 12/2016 | Kim | |
| 2017/0192293 A1 | 7/2017 | Lee et al. | |
| 2018/0039009 A1 | 2/2018 | Chong | |
| 2018/0143494 A1 | 5/2018 | Kim | |
| 2018/0180929 A1* | 6/2018 | Kim ................. | G02F 1/133308 |
| 2018/0364517 A1 | 12/2018 | Oh | |
| 2019/0037164 A1 | 1/2019 | Kim et al. | |

FOREIGN PATENT DOCUMENTS

| | | | |
|---|---|---|---|
| EP | 1 372 021 A1 | 12/2003 | |
| JP | 2003-174692 A | 6/2003 | |
| KR | 2003-0095132 A | 12/2003 | |
| KR | 10-2011-0081115 A | 7/2011 | |
| KR | 10-2012-0001674 A | 1/2012 | |
| KR | 10-2012-0073618 A | 7/2012 | |
| KR | 10-2013-0023007 A | 3/2013 | |
| KR | 10-1275492 B1 | 6/2013 | |
| KR | 10-2013-0087341 A | 8/2013 | |
| KR | 10-2013-0112215 A | 10/2013 | |
| KR | 10-2018-0074491 A | 7/2018 | |
| KR | 10-2018-0136816 A | 12/2018 | |

OTHER PUBLICATIONS

Communication dated May 27, 2021 issued by the European Intellectual Property Office in counterpart European Application No. 20217713.5.

International Search Report dated Apr. 19, 2021 issued by the International Searching Authority in counterpart International Application No. PCT/KR2020/019276 (PCT/ISA/210).

Office Action dated Mar. 20, 2024, issued by Korean Patent Office in Korean Patent Application No. 10-2020-0000285.

Communication issued Apr. 4, 2025 by the European Patent Office in European Patent Application No. 24223897.0.

Communication dated Jul. 28, 2025, issued by the Korean Patent Office in Korean Application No. 10-2024-0197011.

* cited by examiner

<u>1</u>

<u>1</u>

DISPLAY APPARATUS COMPRISING A COVER FRAME HAVING A THROUGH-HOLE THROUGH WHICH A SPEAKER PASSES

CROSS-REFERENCE TO THE RELATED APPLICATION

This application is a Continuation Application of U.S. application Ser. No. 17/139,754, filed on Dec. 31, 2020, which is based on and claims priority under 35 U.S.C. § 119 to Korean Patent Application No. 10-2020-0000285, filed on Jan. 2, 2020, in the Korean Intellectual Property Office, the disclosures of which are incorporated herein by reference in their entireties.

BACKGROUND

1. Field

Embodiments of the present disclosure relate to a display apparatus, and more specifically, to a display apparatus having an improved back cover to provide the display apparatus with a slim thickness.

2. Description of Related Art

A display apparatus is an output device that visually displays data information, such as characters or figures, and images, and the display apparatus includes a television, various monitors, and various portable terminals (e.g., notebook computers, tablet personal computers (tablet PCs), and smart phones).

The display apparatus may include a display module including a display panel and a chassis assembly, and a back cover coupled to a rear side of the display module to form a rear appearance of the display apparatus.

In general, the back cover is formed by injection molding of a metal or plastic material. Use of a plastic material facilitates implementing a shape for assembly with a display module, and obviates the need of a separate post-processing, but has a difficulty in implementing a thin thickness due to the characteristics of plastic injection processing. Use of a thin metal may cause deformation due to denting or bending during handling, and thus has a difficulty in securing the appearance quality.

SUMMARY

Therefore, according to an aspect, embodiments of the present disclosure may provide a display apparatus having a back cover that is capable of securing rigidity while having a slim thickness and facilitating assembly with a display module.

Additional aspects of the present disclosure will be set forth in part in the description which follows and, in part, will be understood from the description, or may be learned by practice of the disclosure.

According to one or more embodiments, a display apparatus is provided. The display apparatus includes: a display module; a cover frame provided in a frame shape and coupled to a rear side of the display module to cover the display module; and a cover sheet coupled to a rear side of the cover frame and configured to form an appearance of the display apparatus, wherein the cover frame includes: an edge portion having a quadrangular-shape; a reinforcing portion extending inward from the edge portion; and openings formed between the edge portion and the reinforcing portion.

BRIEF DESCRIPTION OF THE DRAWINGS

These and/or other aspects of the present disclosure will become apparent and more readily appreciated from the following description of embodiments, taken in conjunction with the accompanying drawings of which.

DETAILED DESCRIPTION

The embodiments set forth herein and illustrated in the present disclosure are only example embodiments and are not representative of the full the technical spirit of the present disclosure, so it should be understood that they may be replaced with various equivalents and modifications at the time of the disclosure.

The terminology used herein is for the purpose of describing particular embodiments only and is not intended to limit the disclosure. It is to be understood that the singular forms "a," "an," and "the" include plural references unless the context clearly dictates otherwise.

It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

Figure 1:
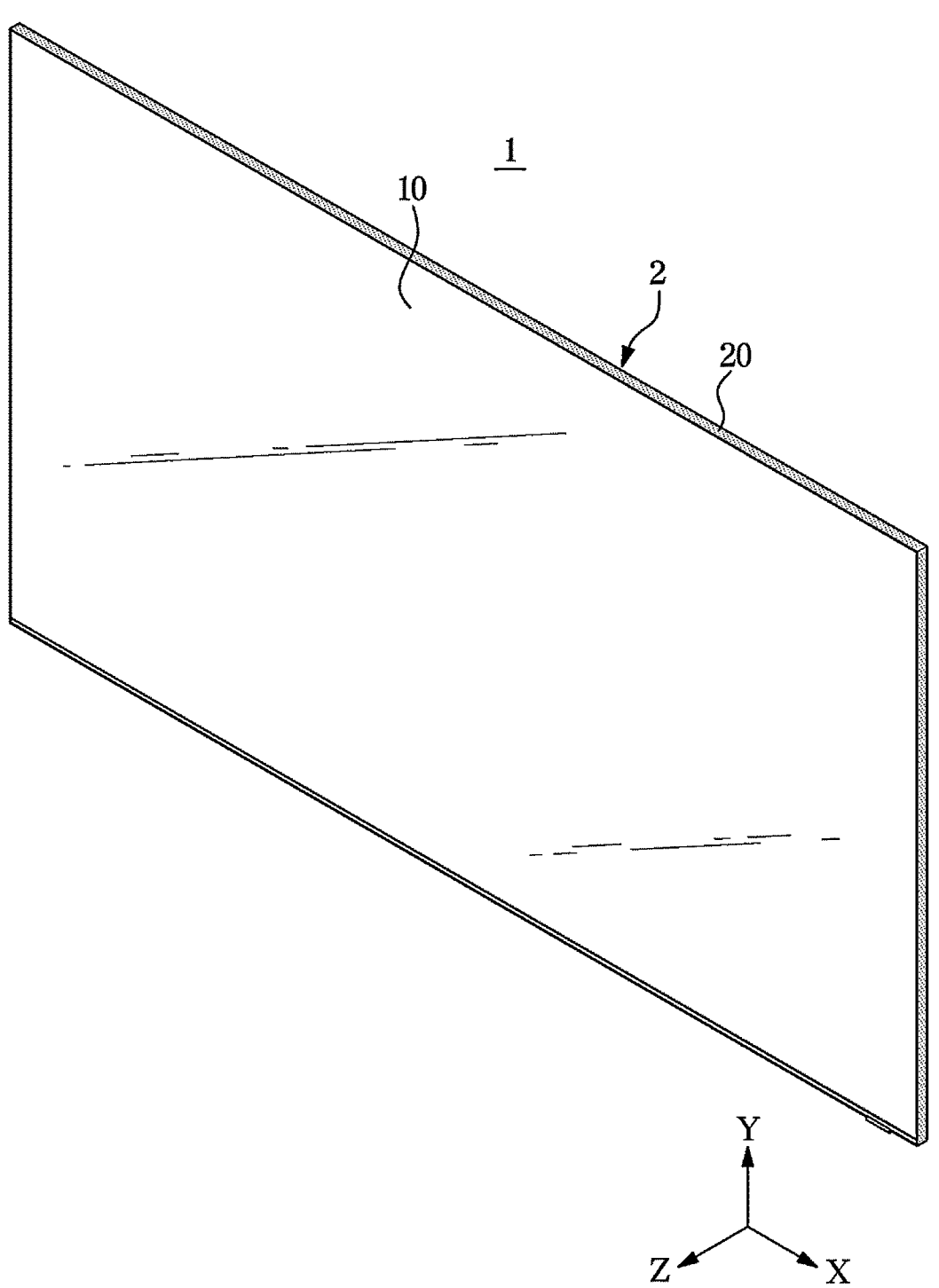
FIG. 1 is a perspective view illustrating a front appearance of a display apparatus according to an embodiment of the present disclosure.

The terms "front", "rear", "upper", "lower", "top", and "bottom" as herein used are defined with respect to the drawings, but the terms may not restrict the shape and position of the respective components. In FIG. 1, the X-axis, Y-axis, and Z-axis directions perpendicular to each other are illustrated, the X-axis direction refers to the left and right side direction of the display apparatus, the Y-axis direction refers to the upper and lower side direction of the display apparatus, and the Z-axis direction refers to the front and rear side direction of the display apparatus.

Hereinafter, embodiments according to the present disclosure will be described in detail with reference to the accompanying drawings.

Figure 2:
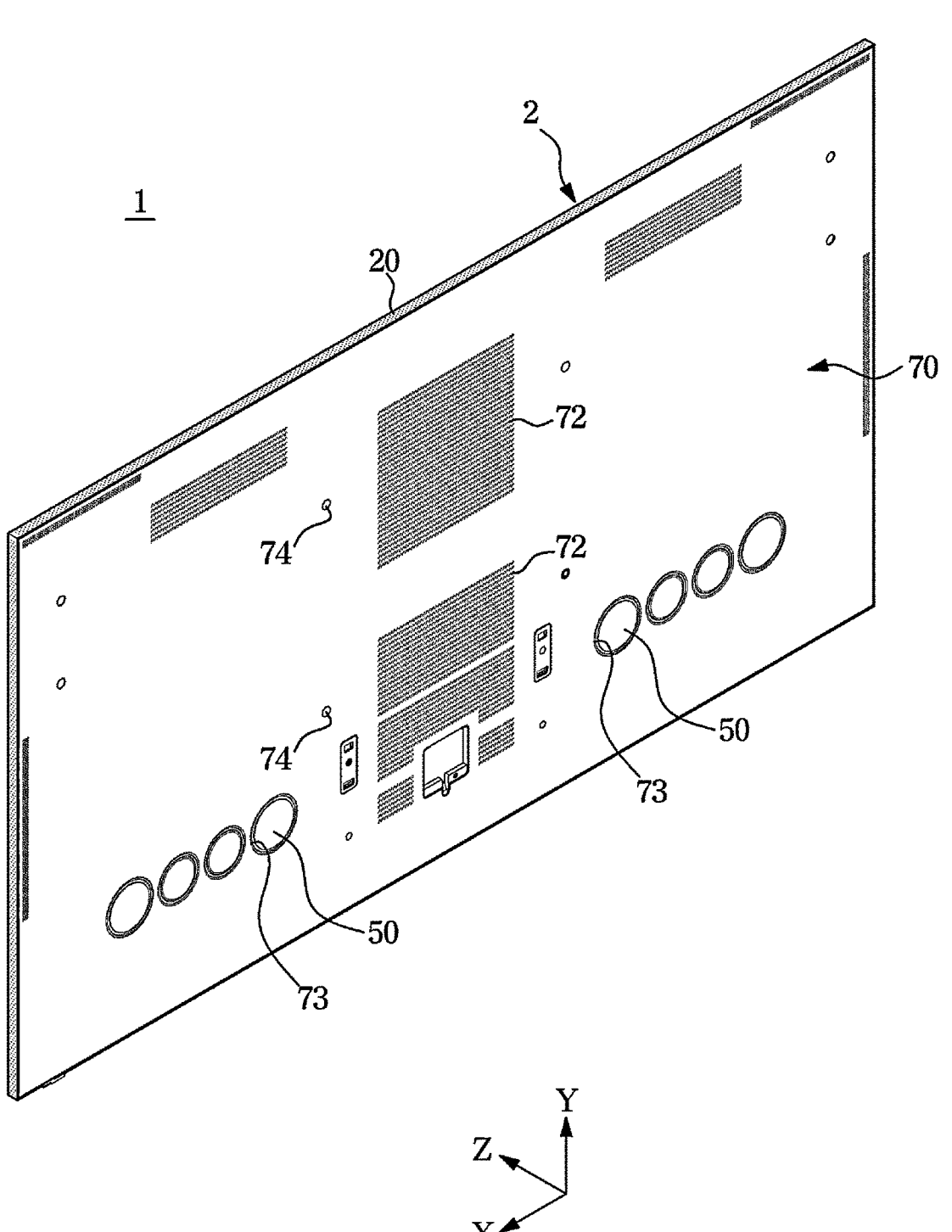
FIG. 2 is a perspective view illustrating a rear appearance of the display apparatus of FIG. 1.
Figure 3:
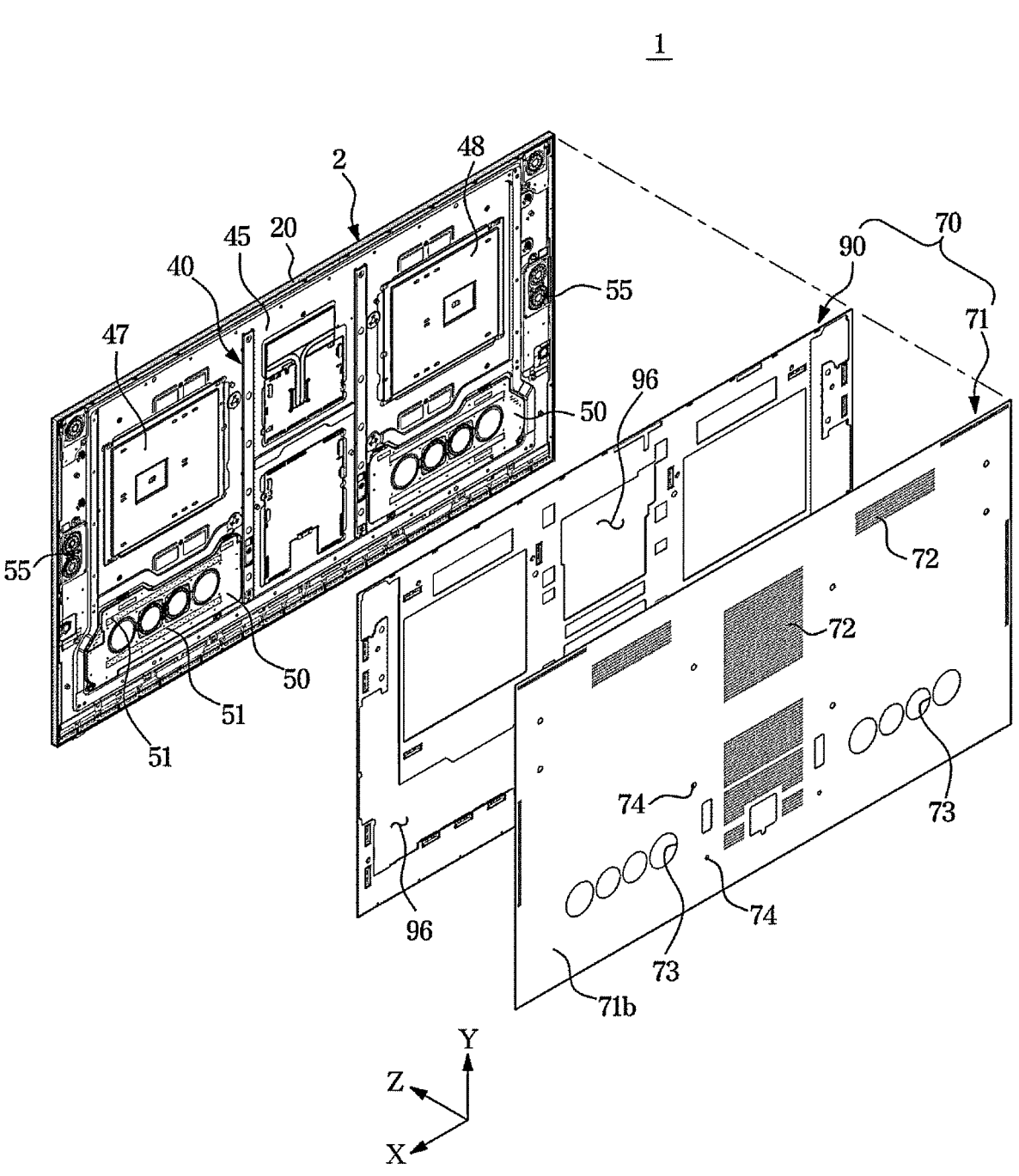
FIG. 3 is an exploded rear perspective view illustrating the display apparatus of FIG. 1.
Figure 4:
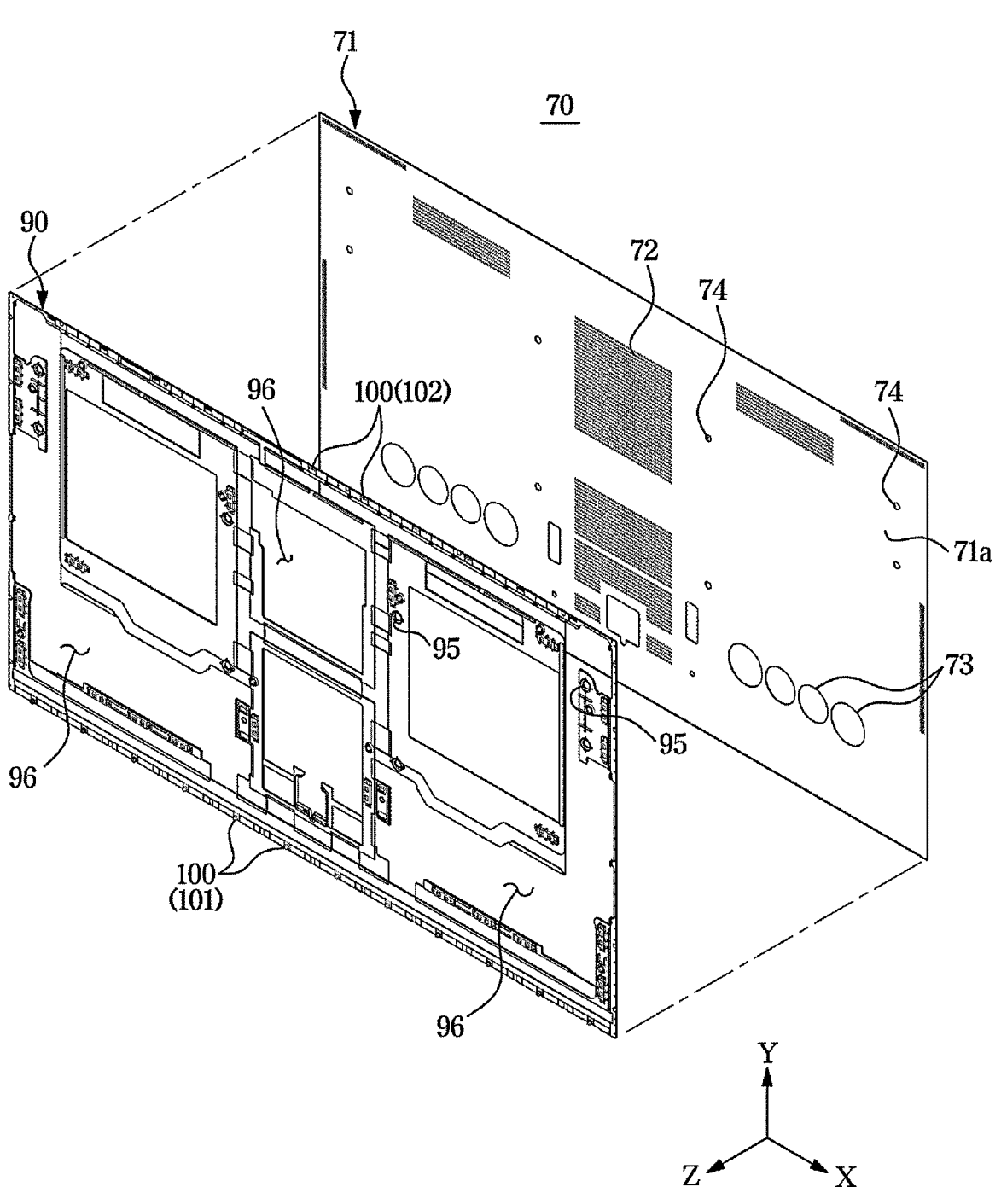
FIG. 4 is a front perspective view illustrating the display apparatus of FIG. 1, in which a cover is disassembled.
Figure 5:
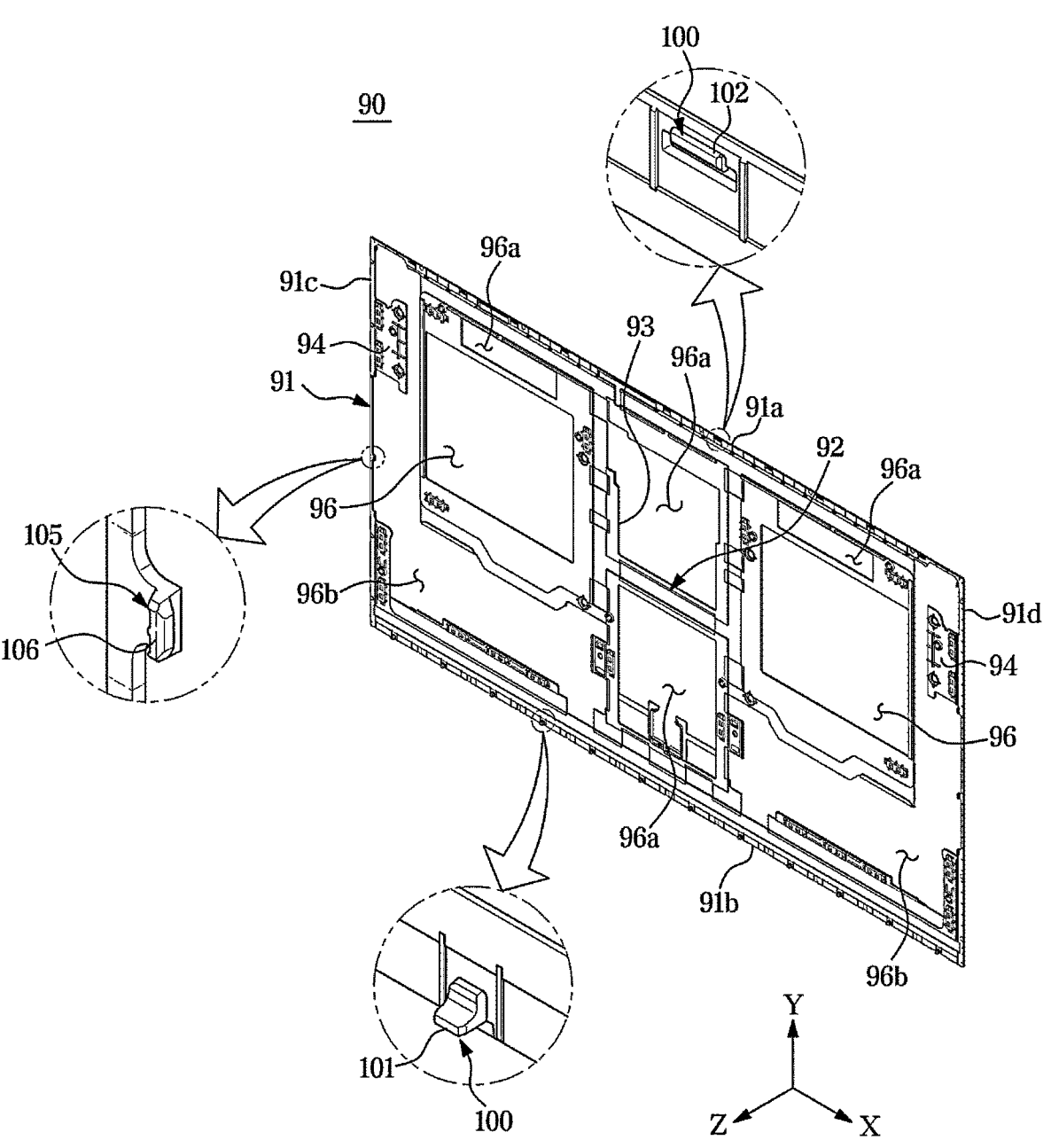
FIG. 5 is a front perspective view illustrating a cover frame of the display apparatus of FIG. 1.
Figure 6:
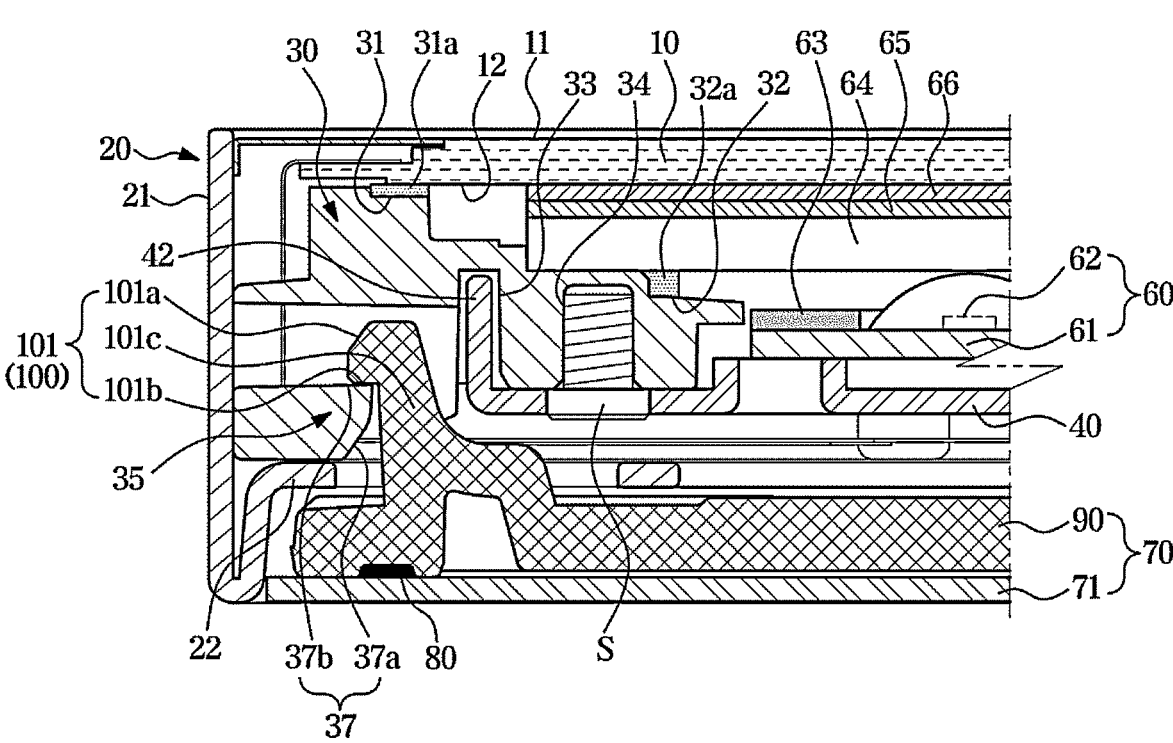
FIG. 6 is a side cross-sectional view illustrating the display apparatus of FIG. 1, which shows a lower coupling structure.
Figure 7:
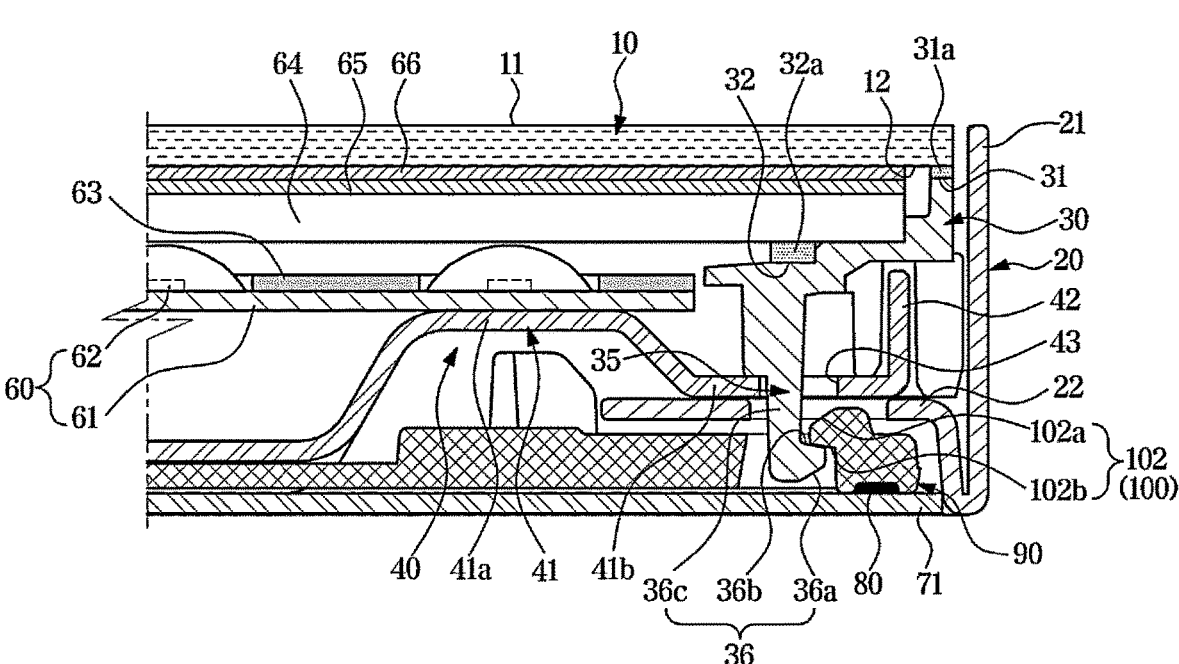
FIG. 7 is a side cross-sectional view illustrating the display apparatus of FIG. 1, which shows an upper coupling structure.

FIG. 1 is a perspective view illustrating a front appearance of a display apparatus according to an embodiment of the present disclosure. FIG. 2 is a perspective view illustrating a rear appearance of the display apparatus of FIG. 1. FIG. 3 is an exploded rear perspective view illustrating the display apparatus of FIG. 1. FIG. 4 is a front perspective view illustrating the display apparatus of FIG. 1 in which a cover is disassembled. FIG. 5 is a front perspective view illustrating a cover frame of the display apparatus of FIG. 1. FIG. 6 is a side cross-sectional view illustrating the display apparatus of FIG. 1, which shows a lower coupling structure. FIG. 7 is a side cross-sectional view illustrating the display apparatus of FIG. 1, which shows an upper coupling structure.

Referring to FIGS. 1 to 7, a display apparatus 1 according to an embodiment may include a television that processes a broadcast image based on broadcast signals, broadcast information, and broadcast data received from a transmission device of a broadcast station. However, the display apparatus 1 is not limited to a television, and may include various devices that can present information, data material, data, etc. as characters, figures, graphs, images, etc., for example, a computer monitor, a mobile phone, an electric signboard, a signage, and the like.

The display apparatus 1 may include a display module 2 and a cover 70 coupled to a rear side of the display module 2 to form a rear appearance of the display apparatus 1.

The display module 2 may include a display panel that displays an image. In the embodiment, the display panel may be implemented as a liquid crystal panel 10. However, the display panel is not limited thereto, and the display panel may be a self-emitting type organic light emitting diode (OLED) panel or a micro LED panel, and in this case, a backlight unit described below may be omitted.

The liquid crystal panel 10 may include a thin film transistor (TFT) substrate in which TFTs are formed in a matrix form, a color filter substrate coupled in parallel with the TFT substrate, and liquid crystal molecules interposed between the TFT substrate and the color filter substrate and having a variable optical property depending on a voltage and temperature.

The liquid crystal panel 10 may have a front surface 11 on which an image is displayed, a rear surface 12 formed on the opposite side of the front surface 11, and four side surfaces formed on upper, lower, left, and right sides thereof.

The display module 2 may include a backlight unit disposed behind the liquid crystal panel 10 to provide light to the liquid crystal panel 10.

The backlight unit may be disposed behind the liquid crystal panel 10 to radiate light toward the liquid crystal panel 10. The backlight unit may include a light source module 60 including a light source 62 and a substrate 61 on which the light source 62 is mounted, and optical members disposed on a moving path of light emitted from the light source 62.

In the embodiment, the light source module 60 is arranged behind the liquid crystal panel 10 in a so-called direct type arrangement. However, unlike the embodiment shown in FIG. 1, the light source module 60 may be arranged to correspond to at least one side surface of the liquid crystal panel 10 in a so-called edge type arrangement.

A blue light emitting diode (LED) may be used as the light source. In addition, a cold cathode fluorescent lamp (CCFL) and an external electrode fluorescent lamp (EEFL) may be used as the light source.

The optical members may be disposed on a moving path of light emitted from the light source 62 to guide a traveling direction of light or improve optical characteristics.

The optical members may include a reflector plate 63 to reflect light to prevent loss, a diffusor plate 64 to evenly diffuse irregular light emitted from the light source 62, a quantum dot sheet 65 to improve color reproducibility by changing the wavelength of light, and an optical sheet 66 to improve optical properties.

The reflector plate 63 may reflect light emitted from the light source 62 or light exiting the diffusor plate 64 rearward to be directed toward the diffusor plate 64. The reflector plate 63 may be disposed on the substrate 61 of the light source module 60.

The diffusor plate 64 may evenly diffuse irregular light generated from the light source 62 and support the quantum dot sheet 65 and the optical sheet 66.

The quantum dot sheet 65 may be disposed in front of the diffusor plate 64 to be spaced apart from the diffusor plate 64. Quantum dots, which are semiconductor crystals having a size of several nanometers and emitting light, may be disposed inside the quantum dot sheet 65 in a distributed manner. Quantum dots may receive blue light and generate all colors of visible light according to the size thereof. As the size of the quantum dot is smaller, light with a shorter wavelength may be generated, and as the size of the quantum dot is larger, light with a longer wavelength may be generated.

The optical sheet 66 may be disposed in front of the diffusor plate 64 to improve optical characteristics of light emitted from the diffusor plate 64. The optical sheet 66 may include at least one of a prism sheet that improves luminance by concentrating light, a protection sheet that protects other optical sheets from external impacts or foreign matter inflow, or a reflective polarizing sheet (a dual brightness enhancement film; DBEF) that reflects one polarized light while transmitting other polarized light to improve luminance.

The display module 2 may include a chassis assembly that supports and accommodates the liquid crystal panel 10. The backlight unit may also be accommodated and supported by the chassis assembly.

The chassis assembly includes a middle mold 30 supporting the liquid crystal panel 10 and the diffusor plate 64, a front chassis 20 covering sides of the liquid crystal panel 10 and the middle mold 30, and a rear chassis 40 disposed behind the middle mold 30 to support the light source module 60 and the middle mold 30.

The middle mold 30 may have a frame shape with an opening formed in the center thereof so that light emitted from the light source 62 is incident onto the diffusor plate 64. The middle mold 30 may include a panel support surface 31 that supports the liquid crystal panel 10 and a sheet support surface 32 that supports the diffusor plate 64.

An adhesive 31a may be provided between the panel support surface 31 and the liquid crystal panel 10 so as to bond the panel support surface 31 to the liquid crystal panel 10. The adhesive 31a may allow the liquid crystal panel 10 to be bonded to the middle mold 30 without using a separate structure.

An adhesive 32a may be provided between the sheet support surface 32 and the diffusor plate 64 so as to bond the sheet support surface 32 to the diffusor plate 64. The adhesive 32a allows the diffusor plate 64 to be coupled to the middle mold 30 without using a separate structure.

The middle mold 30 may be coupled to the rear chassis 40 by a screw S. To this end, a screw fastening hole 34 may be formed in the middle mold 30.

The front chassis 20 may have a frame shape to accommodate the liquid crystal panel 10, the middle mold 30, the backlight unit, and the rear chassis 40. The front chassis 20 includes a side portion 21 formed to cover side surfaces of the liquid crystal panel 10, the middle mold 30, the backlight unit, and the rear chassis 40, and a rear portion 22 formed by bending a rear end of the side portion 21.

The rear chassis 40 includes a base portion 41 supporting the light source module 60 and the middle mold 30 and a bent portion 42 extending forward from an edge of the base portion 41 for coupling with the middle mold 30. The bent portion 42 may be inserted into an insertion groove 33 of the middle mold 30.

The base portion 41 may have a curved plate shape, and may include a light source support portion 41a for supporting the light source module 60 and a middle mold support portion 41b for supporting the middle mold 30.

The rear chassis 40 may serve to dissipate heat generated from a heat generating element, such as the light source 62, to the outside. To this end, the rear chassis 40 may be formed of a metal material having high thermal conductivity, such as aluminum or stainless steel (SUS), or a plastic material, such as acrylonitrile butadiene styrene (ABS).

On a rear surface 45 of the rear chassis 40, a main board 47 including at least one electronic component to perform a process for displaying an image signal, and a power supply 48 for supplying power to the display apparatus 1, a driver for allowing an image corresponding to an image signal to be displayed on the liquid crystal panel 10, and a communication module capable of communicating with an external communication device may be provided.

The main board 47 may include electronic components, such as a chipset, a memory, and the like, and a substrate on which the electronic components are mounted. A wiring or transmission line may be provided on the substrate to electrically connect the electronic components to each other. The electronic components may include a tuner for tuning a broadcast signal for each channel and an image processor for processing an image signal. The image processor may be provided as individual configurations capable of independently performing each process for processing an image signal, that is, as a group of electronic components, or may be provided as being included in a main System-on-chip (SOC) into which several functions are incorporated. The main SoC may include at least one processor that controls the overall operation of the display apparatus 1 and a signal flow between internal components.

The processor may load a control program to perform a control operation and execute the loaded control program. The processor may include at least one of a central processing unit (CPU), a microprocessor, or an application processor (AP).

Signals generated or combined through the image processor may be output to the liquid crystal panel 10 through the driver. The driver may be implemented as a control board provided with a timing controller that controls a driving circuit and improves image quality.

The power supply 48 may supply power to each component constituting the display apparatus 1. The power supply 48 may convert commercial alternating current (AC) power input from the outside into power to be supplied to each component of the display apparatus 1, and supply the converted power, and the power supply 48 may include an inverter or a switching mode power supply (SMPS).

A cover 70 may be coupled to a rear side of the rear chassis 40 to cover the above described various electronic components while forming the rear appearance of the display apparatus 1.

The cover 70 may include a cover sheet 71 and a cover frame 90 attached to the cover sheet 71 to couple the cover sheet 71 to the display module 2.

The cover sheet 71 may include a front surface 71a facing the display module 2 and a cover sheet rear surface 71b provided on the opposite side of the front surface 71a to form the rear appearance of the display apparatus 1.

The cover sheet 71 may be formed by extruding a plastic material to have a slim thickness. The cover sheet 71 may be formed with a thin plate shape having the same thickness as a whole. The cover sheet 71 may be formed to be flexible.

Through-holes may be formed in the cover sheet 71. The through-holes may include a vent hole 72 for flowing air inside and outside the cover sheet 71, a speaker hole 73 through which sound output from a speaker 50 (e.g., a main speaker) passes, and a bracket installation hole 74 to which a bracket (not shown) is coupled to install the display apparatus 1 on a wall.

The through-holes may be formed in the cover sheet 71 by applying a design corresponding to the through-holes to a surface of an extrusion roller, so that through-holes may be implemented at the same time as extrusion.

As the plastic materials for the cover sheet 71, polycarbonate (PC), polyphenylene ether (PPE), nylon, polyphenylene sulfide (PPS), polyphthalamide (PPA), acrylonitrile butadiene styrene copolymer (ABS), and poly cyclohexylene dimethylene terephthalate glycol (PCTG)), and polyethylene terephthalate glycol(PETG), etc. may be used.

In addition, the cover sheet 71 may be formed by extruding a composite material to reinforce rigidity and increase resistance to heat. As the composite material, carbon fiber, glass fiber, mica, montmorillonite, smectite, etc. may be used. The use of the composite material provides a higher rigidity than using plastic, and provides excellent resistance to local impact compared to using metal.

The cover frame 90 may be attached to a front surface of the cover sheet 71 to reinforce the rigidity of the cover sheet 71 while allowing the cover sheet 71 to be coupled to the display module 2.

The cover frame 90 may be injection-molded of a plastic material, and the cover frame 90 may be formed to be rigid. Accordingly, the cover sheet 71 may be relatively flexible compared to the cover frame 90, and conversely, the cover frame 90 may be relatively rigid compared to the cover sheet 71.

The cover sheet 71 and the cover frame 90 may be coupled to each other through an adhesive 80. As the adhesive 80, a two-component adhesive, a pressure sensitive adhesive (PSA), an ultraviolet (UV) adhesive, a double-sided tape, or the like may be used.

The cover frame 90 may have a shape corresponding to only a partial area of the cover sheet 71 rather than to the entire area of the cover sheet 71. That is, the cover frame 90 is provided in a frame shape including an edge portion 91 having a quadrangular-shape and a reinforcing portion 92 extending inward from the edge portion 91 such that openings 96 are formed between the edge portion 91 and the reinforcing portion 92.

The edge portion 91 may include an upper edge portion 91a, a lower edge portion 91b, a left edge portion 91c, and a right edge portion 91d, and the reinforcing portion 92 may include a central reinforcing portion 93 extending between the upper edge portion 91*a* and the lower edge portion 91*b* and side reinforcing portions 94 extending from the left edge portion 91*c* and the right edge portion 91*d*. A bracket fastening hole 95 corresponding to the bracket installation hole 74 of the cover sheet 71 may be formed in the reinforcing portion 92.

As the electronic components of the main board 47 and the power supply 48, speakers 50 and 55, etc. are disposed in the openings 96, the thickness of the display apparatus 1 may be provided to be slim.

The openings 96 of the cover frame 90 include an opening 96*a* corresponding to the vent hole 72 of the cover sheet 71 and an opening 96*b* wider than or corresponding to the speaker hole 73 of the cover sheet 71.

The cover frame 90 may include a first hook coupling portion 100 for engagement with the display module 2. The display module 2 may be provided with a second hook coupling portion 35 to be engaged with the first hook coupling portion 100. With such a configuration, the cover frame 90 may be engaged with the display module 2 through the first hook coupling portion 100 and the second hook coupling portion 35 without using separate fastening members, such as screws, bolts, nuts, pins, rivets, etc.

The first hook coupling portion 100 may be integrally formed with the cover frame 90. The first hook coupling portion 100 may be formed on the edge portion 91 of the cover frame 90. The first hook coupling portion 100 may be formed on the upper edge portion 91*a* and the lower edge portion 91*b* that are relatively long.

The first hook coupling portion 100 may be provided in plural, and the plurality of the first hook coupling portion 100 may be formed to be spaced apart from each other by a predetermined distance in a line lengthwise along the edge portion 91.

The second hook coupling portion 35 may be formed on the middle mold 30 of the display module 2. The second hook coupling portion 35 may be integrally formed with the middle mold 30. The second hook coupling portion 35 may be formed at a position corresponding to a position of the first hook coupling portion 100.

One of the first hook coupling portion 100 and the second hook coupling portion 35 may be a hook, and the other one may be a hook locking portion provided to be locked with the hook.

As an example, referring to FIGS. 5 and 6, the first hook coupling portion 100 formed on the lower edge portion 91*b* of the cover frame 90 is a hook 101, and the second hook coupling portion 35 formed on the middle mold 30 to correspond to the first hook coupling portion 100 may be a hook locking portion 37 provided to be locked with the hook 101.

The hook 101 may include an inclined guide surface 101*a*, a locking surface 101*b*, and an elastic portion 101*c*, and the hook locking portion 37 may include an inclined guide surface 37*a* and a locking surface 37*b*.

When the hook 101 approaches the hook locking portion 37, the inclined guide surface 101*a* of the hook 101 and the inclined guide surface 37*a* of the hook locking portion 38 come in contact with each other, and the elastic portion 101*c* of the hook 101 may be elastically deformed in an open direction.

When the hook 101 further advances while the elastic portion 101*c* is open, the elastic portion 101*c* is restored by the elastic force, and the locking surface 101*b* of the hook 101 and the locking surface 37*b* of the hook locking portion 37 are caused to be locked with each other. Accordingly, the first hook coupling portion 100 and the second hook coupling portion 35 may be engaged with each other.

In addition, referring to FIGS. 5 and 7, the first hook coupling portion 100 formed on the upper edge portion 91*a* of the cover frame 90 may be a hook locking portion 102, and the second hook coupling portion 35 formed on the middle mold 30 to correspond to the first hook coupling portion 100 may be a hook 36 provided to be locked with the hook locking portion 102. The hook 36 may include an inclined guide surface 36*a*, a locking surface 36*b*, and an elastic portion 36*c*, and the hook locking portion 102 may include an inclined guide surface 102*a* and a locking surface 102*b*.

When the hook 36 approaches the hook locking portion 102, the inclined guide surface 36*a* of the hook 36 and the inclined guide surface 102*a* of the hook locking portion 102 come in contact with each other, and the elastic portion 36*c* of the hook 36 may be elastically deformed in an open direction.

When the hook 36 further advances while the elastic portion 36*c* is open, the elastic portion 36*c* is restored by the elastic force, and the locking surface 36*b* of the hook 36 and the locking surface 102*b* of the hook locking portion 102 are caused to be locked with each other. Accordingly, the first hook coupling portion 100 and the second hook coupling portion 35 may be engaged with each other.

However, unlike the embodiment described above, the first hook coupling portion 100 formed on the lower edge portion 91*b* of the cover frame 90 may be a hook locking portion, the first hook coupling portion 100 formed on the upper edge portion 91*a* may be a hook, the second hook coupling portion 35 formed at a lower portion of the middle mold 30 may be a hook, and the second hook coupling portion 35 formed on an upper portion of the middle mold 30 may be a hook locking portion.

Further, each of the first hook coupling portion 100 may be a hook and each of the second hook coupling portion 35 may be a hook locking portion, or each of the first hook coupling portion 100 may be a hook locking portion and each of the second hook coupling portion 35 may be a hook.

The rear chassis 40 may be formed with a through hole 43 through which the hook 36 of the middle mold 30 may pass.

The reason for the cover frame 90 being coupled to the middle mold 30 rather than to the rear chassis 40 is that a sufficient distance may need to be secured to ensure smooth deformation and coupling force of the hook, and typically, the rear chassis 40, which is formed of a metal material, such as aluminum, has poor workability and coupling force of the hook coupling portion, and is liable to be deformed and damaged.

Figure 8:
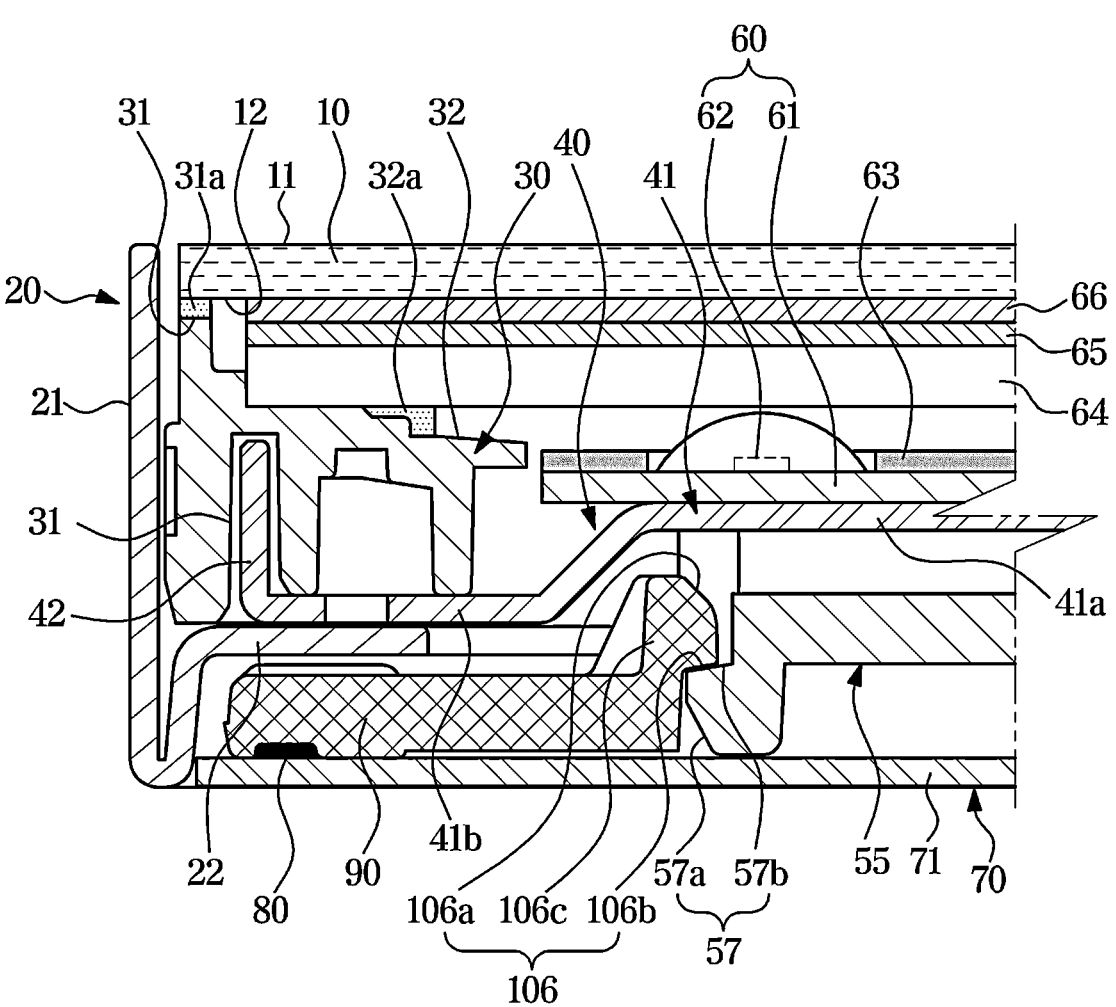
FIG. 8 is a side cross-sectional view illustrating the display apparatus of FIG. 1, which shows a coupling structure of an auxiliary speaker and a cover frame.
Figure 9:
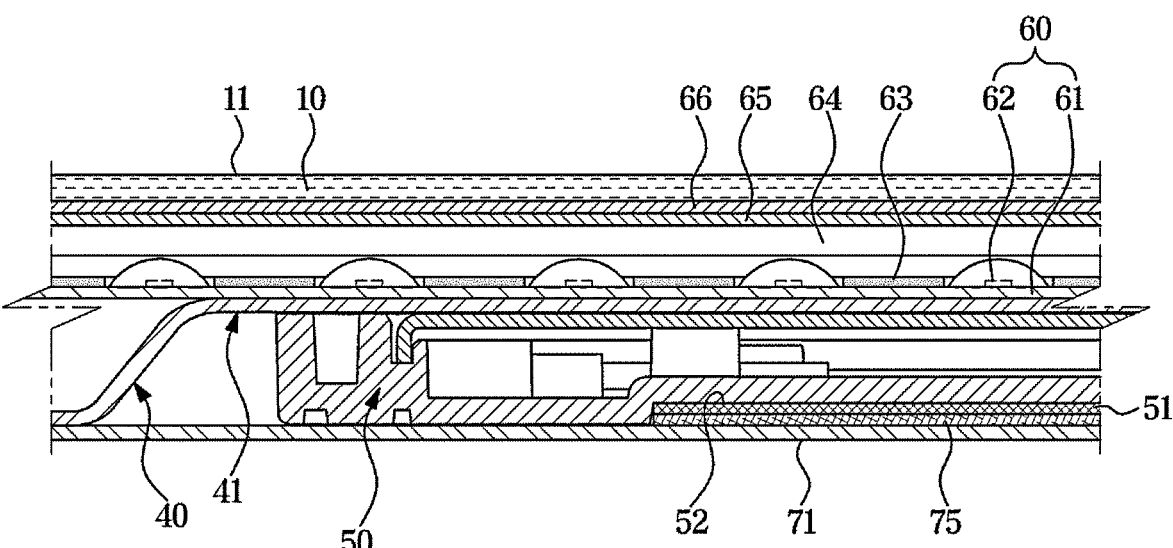
FIG. 9 is a side cross-sectional view illustrating the display apparatus of FIG. 1, which shows a coupling structure between a main speaker and a cover sheet using a magnet.
Figure 10:
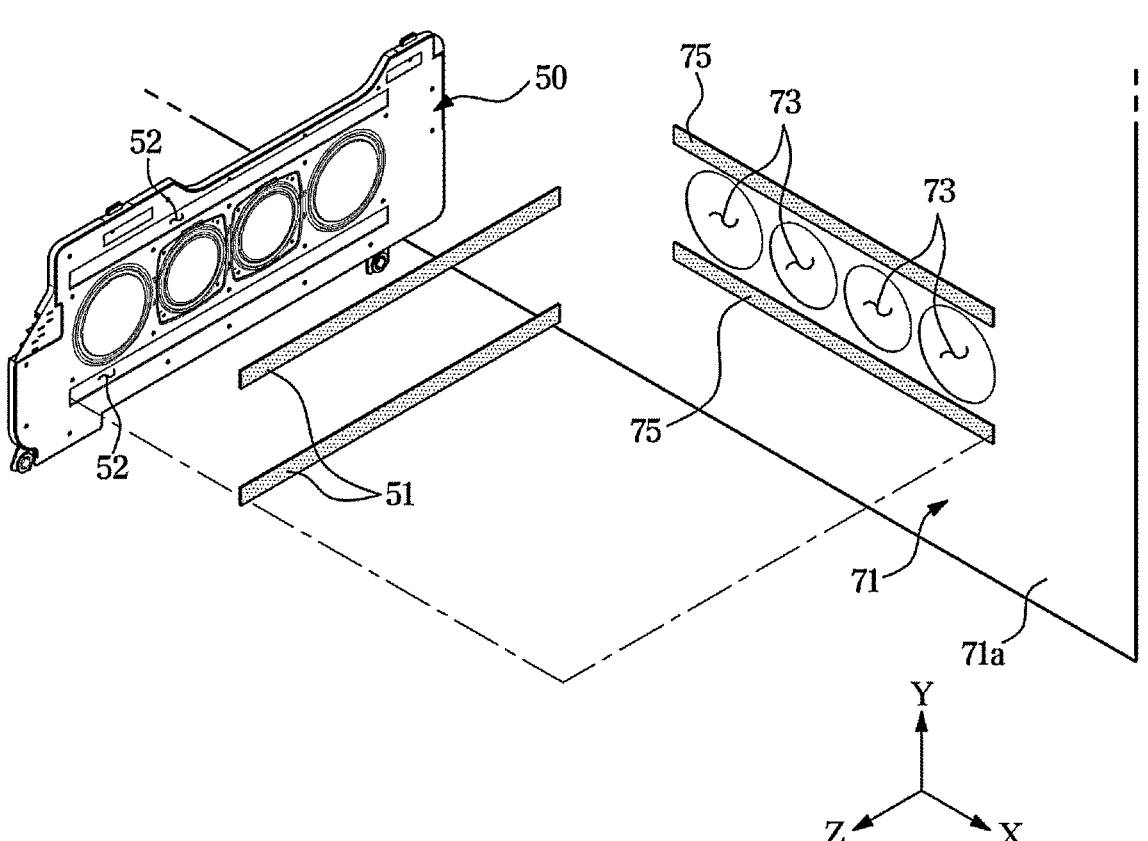
FIG. 10 is a perspective view illustrating the display apparatus of FIG. 1, which shows a coupling structure between a main speaker and a cover sheet using a magnet.

FIG. 8 is a side cross-sectional view illustrating the display apparatus of FIG. 1, which shows a coupling structure of an auxiliary speaker and a cover frame. FIG. 9 is a side cross-sectional view illustrating the display apparatus of FIG. 1, which shows a coupling structure between a main speaker and a cover sheet using a magnet. FIG. 10 is a perspective view illustrating the display apparatus of FIG. 1, which shows a coupling structure between a main speaker and a cover sheet using a magnet.

Speakers 50 and 55 may be disposed between the display module 2 and the cover 70. Specifically, the speakers 50 and 55 may be installed on the rear surface 45 of the rear chassis 40.

If the display module 2 and the cover 70 do not come in close contact with each other around the speakers 50 and 55, and the cover 70 is lifted, vibration and noise may occur.

According to the embodiment of the present disclosure, the display apparatus 1 may have a structure in which the display module 2 and the cover 70 come in close contact with each other at a portion adjacent to the speakers 50 and 55 to prevent such vibration and noise.

First, referring to FIG. 8, the cover frame 90 may be directly hook-coupled to the speaker 55. To this end, the cover frame 90 may include a third hook coupling portion to be coupled to the speaker 55, and the speaker 55 may include a fourth hook coupling portion to be engaged with the third hook coupling portion.

The third hook coupling portion is a hook 106, and the fourth hook locking portion corresponding thereto may be a hook locking portion 57 to be engaged with the hook 106.

The hook 106 may include an inclined guide surface 106a, a locking surface 106b, and an elastic portion 106c, and the hook locking portion 57 may include an inclined guide surface 57a and a locking surface 57b.

When the hook 106 approaches the hook locking portion 57, the inclined guide surface 106a of the hook 106 and the inclined guide surface 57a of the hook locking portion 57 come in contact with each other, and the elastic portion 106c of the hook 106 may be elastically deformed in an open direction.

When the hook 106 further advances while the elastic portion 106c is open, the elastic portion 106c is restored by the elastic force, and the locking surface 106b of the hook 106 and the locking surface 57b of the hook locking portion 57 are caused to be locked with each other. Accordingly, the third hook coupling portion and the fourth hook coupling portion may be engaged with each other.

Conversely, the third hook coupling portion may be a hook locking portion, and the fourth hook coupling portion may be a hook corresponding to the hook locking portion.

In addition, referring to FIGS. 9 and 10, the speaker 50 includes a speaker magnet 51, and the cover sheet 71 may include a sheet magnet 75 installed on the cover sheet front surface 71a of the cover sheet 71 so as to come in close contact with the speaker magnet 51 by magnetic attraction.

The sheet magnet 75 may be formed at a position corresponding to the position of the speaker magnet 51. That is, the sheet magnet 75 may be formed at a position adjacent to the speaker hole 73. The sheet magnet 75 may be formed adjacent to an upper side and a lower side of the speaker hole 73.

The sheet magnet 75 may be fixed to the front surface 71a of the cover sheet 71 by various adhesives.

The speaker 50 may be formed with a magnet installation groove 52 in which the speaker magnet 51 is installed, and the speaker magnet 51 may be inserted into the magnet installation groove 52.

The speaker magnet 51 and the sheet magnet 75 may include rubber permanent magnets. For example, the speaker magnet 51 and the sheet magnet 75 may include a neodymium magnet, a ferrite magnet, a samarium cobalt magnet, or an alnico magnet.

However, according to embodiments, one of the speaker magnet 51 and the sheet magnet 75 may include a magnet, and the other one may be a magnetic body on which a magnetic attraction of the magnet is exerted.

As is apparent from the above, the overall thickness of the display apparatus can be reduced by forming the back cover of the display apparatus to be slim.

In addition, the display apparatus can be provided with an improved appearance quality and handling reliability.

In addition, since the back cover may be assembled with the display module without using screws, the back cover can be formed slim, and ease of assembly and aesthetic quality can be improved.

Although specific embodiments of the disclosure have been shown and described, the above embodiments are for illustrative purpose only, and it would be appreciated by those skilled in the art that changes and modifications may be made in these embodiments without departing from the principles and scope of the disclosure.

What is claimed is:

1. A display apparatus comprising:
a display module;
a cover frame provided in a frame shape and coupled to a rear side of the display module to cover the display module;
a cover sheet coupled to a rear side of the cover frame and configured to form an appearance of the display apparatus; and
a speaker installed on a rear surface of the display module,
wherein the cover frame comprises:
an edge portion having a quadrangular-shape;
a reinforcing portion extending inward from the edge portion; and
through-holes formed between the edge portion and the reinforcing portion, and
wherein the through-holes comprise a first through-hole through which the speaker passes.

2. The display apparatus of claim 1, further comprising a main board configured to drive the display module,
wherein the through-holes comprise a second through-hole through which the main board passes.

3. The display apparatus of claim 1, further comprising a power supply configured to supply power to each component constituting the display apparatus,
wherein the through-holes comprise a second through-hole through which the power supply passes.

4. The display apparatus of claim 1, wherein the cover sheet includes a vent through-hole for flowing air inside and outside the cover sheet,
wherein the through-holes comprise a second through-hole corresponding to the vent through-hole.

5. The display apparatus of claim 2, wherein the cover frame comprises a first hook coupling portion to be coupled to the speaker, and
the first hook coupling portion is formed protruding from the edge portion toward the first through-hole.

6. The display apparatus of claim 1, wherein the speaker comprises a speaker magnet installed on a rear surface of the speaker, and
the cover sheet comprises a sheet magnet installed on a front surface of the cover sheet to come in close contact with the speaker magnet by magnetic attraction.

7. The display apparatus of claim 6, wherein the cover sheet is formed with a speaker through-hole through which sound output from the speaker passes, and
the sheet magnet is installed on the front surface of the cover sheet to be adjacent to the speaker through-hole.

8. The display apparatus of claim 1, further comprising a front chassis that comprises a side portion forming sides of the display module,
wherein the cover frame and the cover sheet are disposed inside the side portion.

9. The display apparatus of claim 8, wherein the side portion comprises an inner surface facing an outer end of the cover sheet, and the outer end of the cover sheet contacts with the inner surface of the side portion.

* * * * *